US008714026B2

(12) United States Patent
Froggatt et al.

(10) Patent No.: US 8,714,026 B2
(45) Date of Patent: May 6, 2014

(54) STRAIN SENSING WITH OPTICAL FIBER ROSETTES

(75) Inventors: Mark E. Froggatt, Blacksburg, VA (US); Dawn K. Gifford, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 219 days.

(21) Appl. No.: 13/081,056

(22) Filed: Apr. 6, 2011

(65) Prior Publication Data

US 2011/0247427 A1    Oct. 13, 2011

Related U.S. Application Data

(60) Provisional application No. 61/322,430, filed on Apr. 9, 2010.

(51) Int. Cl.
*G01L 1/24*        (2006.01)
(52) U.S. Cl.
USPC .......................................................... 73/800
(58) Field of Classification Search
USPC .......................................................... 73/800
See application file for complete search history.

(56) References Cited

U.S. PATENT DOCUMENTS

| | | | | |
|---|---|---|---|---|
| 4,947,693 A | * | 8/1990 | Szuchy et al. | 73/800 |
| 5,201,015 A | * | 4/1993 | von Bieren et al. | 385/13 |
| 5,798,521 A | | 8/1998 | Froggatt | |
| 6,545,760 B1 | | 4/2003 | Froggatt et al. | |
| 6,566,648 B1 | | 5/2003 | Froggatt | |
| 6,586,722 B1 | | 7/2003 | Kenny et al. | |
| 6,816,243 B2 | * | 11/2004 | Shurgalin et al. | 356/73.1 |
| 7,231,121 B2 | * | 6/2007 | Park et al. | 385/123 |
| 7,440,087 B2 | | 10/2008 | Froggatt et al. | |
| 7,720,322 B2 | * | 5/2010 | Prisco | 385/12 |
| 7,720,324 B2 | | 5/2010 | Haase et al. | |
| 7,772,541 B2 | | 8/2010 | Froggatt et al. | |
| 7,781,724 B2 | * | 8/2010 | Childers et al. | 250/227.14 |
| 7,813,599 B2 | * | 10/2010 | Moore | 385/13 |
| 2007/0201793 A1 | | 8/2007 | Askins et al. | |
| 2007/0284112 A1 | | 12/2007 | Magne et al. | |

OTHER PUBLICATIONS

Valis, T., Tapanes, E. and Measures, R.M., "Localized fiber optic strain sensor embedded in composite materials," Proc. SPIE Fiber Optic Smart Structures and Skins II, 1170, 495-504 (1989).
Valis, T. et. al., "Fiber-optic Fabry-Perot strain rosettes," Smart Mater. Struct. 1, 227-232, (1992).

(Continued)

*Primary Examiner* — Lisa Caputa
*Assistant Examiner* — Octavia Davis-Hollington
(74) *Attorney, Agent, or Firm* — Nixon & Vanderhye P.C.

(57) ABSTRACT

One or more mechanical parameters of a structure subjected to a force or condition are measured using distributed, optical fiber sensing technology. At least a curved portion an optical fiber having is attached to an object. A distributed, optically-based, strain sensing technique is used to determine strain information associated with multiple points along the curved portion of the fiber. The determined strain information is processed to generate one or more representations of one or more of the following: an expansion of the object, a thermal gradient associated with the object, or a stress-induced strain at multiple locations on the object corresponding to ones of the multiple points. An output is generated corresponding to the representation.

23 Claims, 13 Drawing Sheets

(56) References Cited

OTHER PUBLICATIONS

Case, S.W., Lesko, J.J., Fogg, B. R., and Carman, J. P., "Embedded extrinsic Fabry-Perot fiber optic strain rosette sensors," J. Intelligent Mater. Syst. Struct., 5, 412-417, (1994).

Magne, S. et. al., "State-of-strain evaluation with fiber Bragg grating rosettes: application to discrimination between strain and temperature effects in fiber sensors," Applied Optics 36 (36), 9437-9447, (1997).

Henry W. Haslach, Jr. and James S. Sirkis, "Surface-mounted optical fiber strain sensor design," Applied Optics, vol. 30, Issue 28, pp. 4069-4080 (1991).

Frank M. Haran, Jason K. Rew and Peter D. Foote, "A Fibre Bragg Grating Strain Gauge Rosette with Temperature Compensation," Proc. SPIE 3330, 220-230, (1998).

Daniel C. Betz, Graham Thursby, Brian Culshaw, and Wieslaw J. Staszewski, "Advanced Layout of a Fiber Bragg Grating Strain Gauge Rosette," Journal of Lightwave Technology, vol. 24, No. 2, Feb. 2006, pp. 1019-1026.

Daniel C. Betz, Graham Thursby, Brian Culshaw and Wieslaw J. Staszewski, "Structural Damage Location with Fiber Bragg Grating Rosettes and Lamb Waves," Structural Health Monitoring 6, 299-308, (2007).

International Search Report and Written Opinion of the International Searching Authority, Dec. 7, 2011, in International Application No. PCT/US2011/031368.

Betz et al., "Advanced Layout of a Fiber Bragg Grating Strain Gauge Rosette", Journal of Lightwave Technology, vol. 24, No. 2, Feb. 2006, pp. 1019-1026, IEEE 0733-8724.

International Preliminary Report on Patentability mailed Oct. 18, 2012 in International Application No. PCT/US2011/031368.

* cited by examiner

Fig. 6A  Tension, Positive Strain
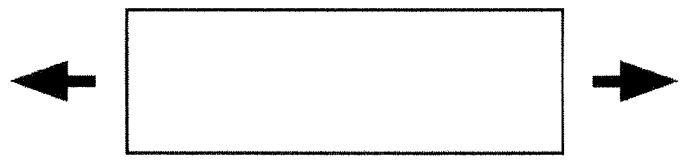
Fig. 6B  Compression, Negative Strain
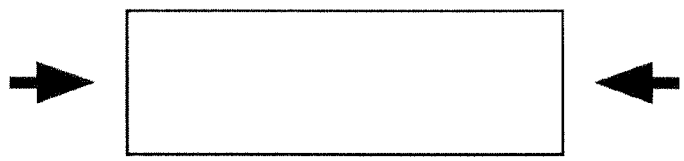
Fig. 7A
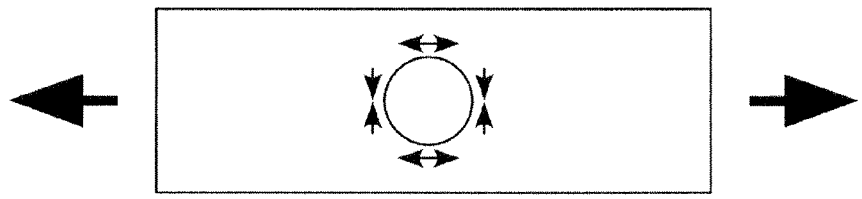
Fig. 7B
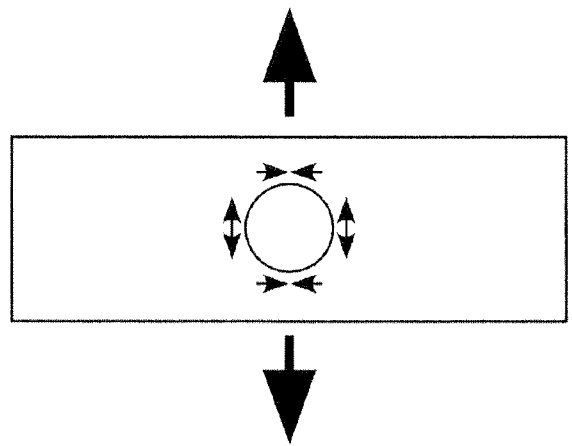
Fig. 7C
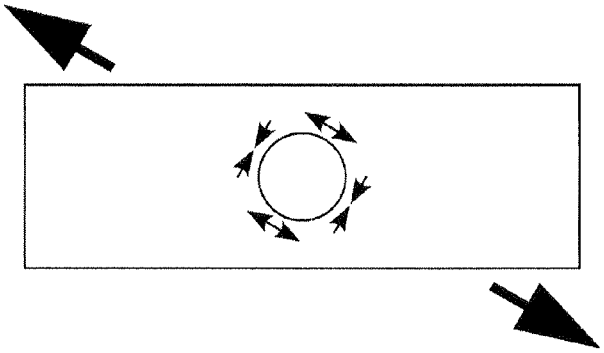

Nominal

Plate heated:

Plate cooled: Compression

Thermal Gradient:
    Expansion on Left, Compression on Right

0th

1th

2nd

3rd

4th

STRAIN SENSING WITH OPTICAL FIBER ROSETTES

PRIORITY APPLICATION

This application claims priority from U.S. provisional patent application Ser. No. 61/322,430, filed on Apr. 9, 2010, the contents of which are incorporated herein by reference.

TECHNICAL FIELD

The technology relates to strain sensing, sensors, and applications thereof.

BACKGROUND

There is a need to separate strain and temperature for fiber sensing. Foil strain gauges may be used to measure the strain on a mechanical structure. FIG. 1 is an illustration of a foil gauge, which because of its flower petals resemblance, is often called a foil gauge rosette. Foil strain sensors show similar cross sensitivities primarily due to the dominance of the thermal expansion coefficient of the material under test in most testing circumstances. On a structure where the orientation of the principal strain axis is unknown, a foil strain gauge rosette may be used to measure strain in two or three axes and thus determine the principal strains. A rosette of three gauges may be created by placing gauges at 0, 45, and 90 degrees as shown in FIG. 1.

By measuring the strain components along three different axes, common mode effects, such as those due to temperature changes in the material under test, can be removed from the strain measurement. A typical foil gauge rosette employs three strain gauges, each requiring three electrical connections for best use. This configuration can be tedious and bulky if multiple measurement points are required.

The inventors in this application realized that high resolution (along the length of the fiber) and high accuracy (in strain) strain measurements possible using modern fiber optic sensing systems means that curved lengths of fiber can be used to measure complex strain fields. Advantages of using curved fiber include smaller and more flexible sensors along with easy production and installation of same.

SUMMARY

One or more mechanical parameters of a structure subjected to a force or condition are measured using distributed, optical fiber sensing technology. At least a curved portion an optical fiber is attached to an object. A distributed, optically-based, strain sensing technique is used to determine strain information associated with multiple points along the curved portion of the fiber. The determined strain information is processed to generate one or more representations of one or more of the following: an expansion of the object, a thermal gradient associated with the object, or a stress-induced strain at multiple locations on the object corresponding to ones of the multiple points. An output is generated corresponding to the representation.

In non-limiting example embodiments, the optical fiber includes multiple alternating arcs and/or one or more fiber loops.

Examples of the force or condition include one or more of stress, load, temperature, temperature gradient, or higher order strain terms. One advantage of this technology is that when the object is subjected to a stress and to a temperature gradient, the processing can distinguish between temperature-induced strain and stress-induced strain.

In one non-limiting example embodiment, the distributed, optically-based, strain sensing technique is based on Rayleigh scatter in at least the curved portion of the fiber. Optical frequency domain reflectometry (OFDR) may be used, for example, to implement this technique. In an alternative non-limiting example embodiment, the distributed, optically-based, strain sensing technique is based on Bragg gratings positioned along at least the curved portion of the fiber.

In an example implementation, the processing is based on a relationship between a change in phase in transmitted and reflected light through the curved portion of the fiber and a change in length in the curved portion of the fiber. The processing includes taking a Fourier transform of the determined strain information to generate the one or more representations. The Fourier transform produces a first order term corresponding to a derivative of the change in phase that is associated with the expansion of the object, a first harmonic term that is a geometric function of an angle of the curved fiber portion that is associated with the thermal gradient associated with the object, and a second harmonic term that is a geometric function of twice an angle of the curved fiber portion that is associated with the stress-induced strain at multiple locations on the object corresponding to ones of the multiple points along the curved portion of the fiber. The Fourier transform may also produce higher order terms higher than the second harmonic term.

To function as a rosette, the multiple points along the curved portion of the fiber may include at least three points spaced along the curved portion such that a first one of the points is oriented at zero degrees, a second one of the points is oriented 90 degrees from the first point, and a third one of the points is oriented between the first and second points.

BRIEF DESCRIPTION OF THE DRAWINGS

FIGS. 6A and 6B show tension and compression on a test plate;

FIGS. 7A-7C show effects of applying a uni-axial load to a test plate with a fiber loop bonded to its surface;

DETAILED DESCRIPTION

Figure 1:
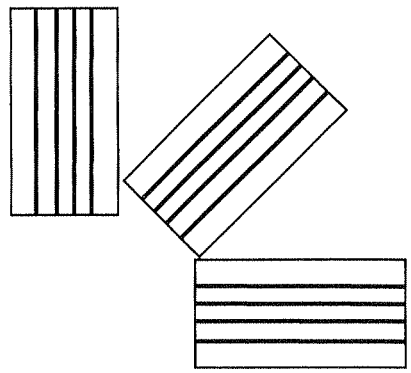
FIG. 1 is an illustration of a foil strain gauge rosette.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a computer-readable storage medium, and when the instructions are executed by a computer or other suitable processor control, the computer or processor performs the functions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 2:
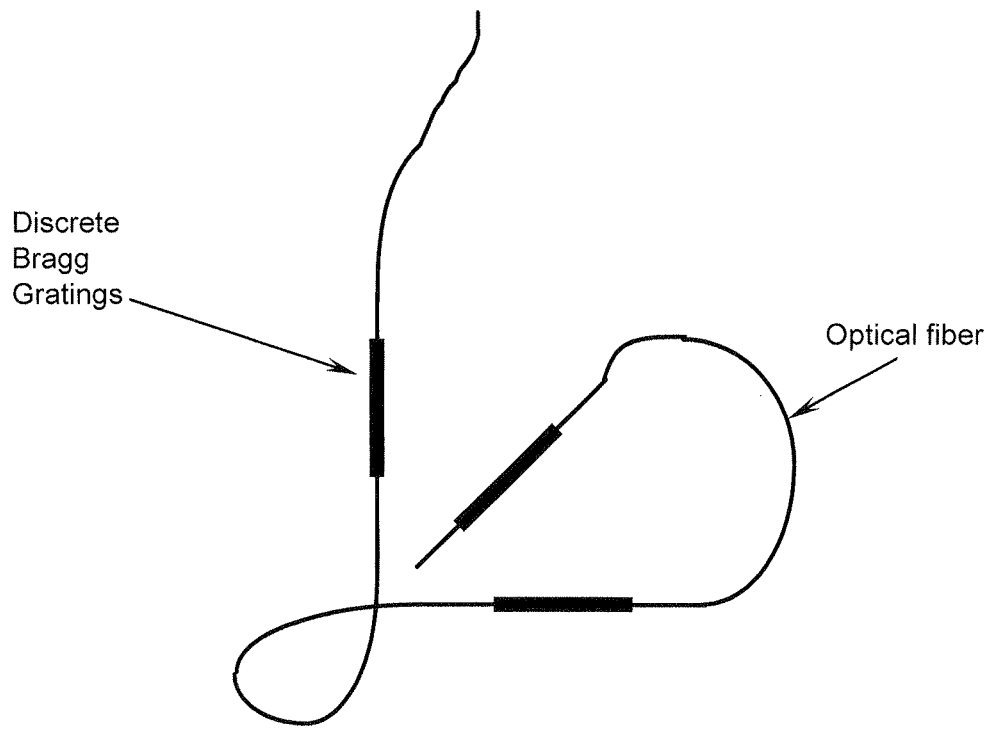
FIG. 2 is a strain rosette using discrete Bragg gratings.

Optical fiber rosette structures may be designed by substituting a fiber with a Bragg grating for each of the strain gauges above. The design of such a structure tends to be driven by the length of the Bragg gratings and the perceived need to have the entire grating parallel to the sensed direction of strain. An example of such a rosette constructed using a length of optical fiber with three Bragg gratings is shown in FIG. 2. But such a rosette does not have the full advantages afforded by distributed fiber strain sensing. Examples of distributed fiber strain sensing are described in commonly-assigned U.S. Pat. Nos. 5,798,521; 6,545,760; 6,566,648; 7,440,087; and 7,772,541, all of which are incorporated herein by reference.

A fiber rosette that can be used to take full advantage of distributed fiber strain sensing may be formed by curving ("wiggling") the fiber in a series of periodic, circular arcs. The arcs preferably cover 90 degrees to get a measure of the strain components covered by a typical rosette. A distributed measurement of the strain along the fiber since the sensed strain is constantly oscillating. This periodic nature of the strain decomposition means that Fourier transforms can be used in the analysis of the measured strain in the fiber and to convert a one dimensional oscillatory strain into multiple strain-related parameters including: an isotropic expansion and two orthogonal strain fields. Distributed strain measurement may be achieved by using a Rayleigh scatter based strain measurement or a Bragg grating based measurement with a phase derivative calculation to find the strain continuously along the grating as described in the patents incorporated by reference above. In summary, commercially available OFDR systems can measure reflected signals below −130 dB with tens of microns of spatial resolution. As such, they offer a sensitive and accurate measurement of the Rayleigh scatter reflected from standard optical fiber. The spatial pattern of this scatter is formed in the fiber when it is manufactured and is a random, but repeatable, pattern that is unique in each fiber. This scatter pattern forms the "sensor" used for Rayleigh scatter-based, OFDR distributed sensing. When the fiber is strained, this scatter pattern is stretched which leads to a shift in the frequency spectrum reflected from the stretched section of fiber just as the reflected frequency of a Bragg grating shifts when it is stretched or strained. The reflected spectrum of a given segment of fiber as measured using OFDR can be found by windowing the complex data at the desired location and performing an inverse Fourier transform.

Figure 3:
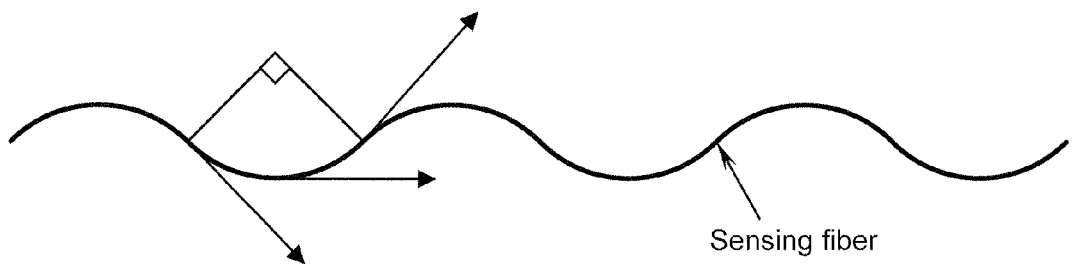
FIG. 3 shows a curving optical fiber with oscillating quarter arcs.

FIG. 3 shows an example of a curved fiber with quarter arcs that correspond to six rosette strain sensors. This quarter-arc curved fiber is only 11% longer than a straight fiber. A half-arc curved fiber would be 57% longer, but would provide for strain vectors parallel and perpendicular to the layout direction. If the fiber has a high numerical aperture, a small bend radius may be used, e.g., 3 mm, to create a rosette every 5 mm long the fiber. In one non-limiting example, curved fiber is approximately 80 microns in diameter and mounted in polyamide tape or other adhesive that for bonding the fiber the surface of the object to be tested. Such a curved fiber could also be embedded/formed within the object to be tested. The terminology "attached to the object" encompasses any means or way that allows the curved fiber to move with movement of the object.

Figure 4:
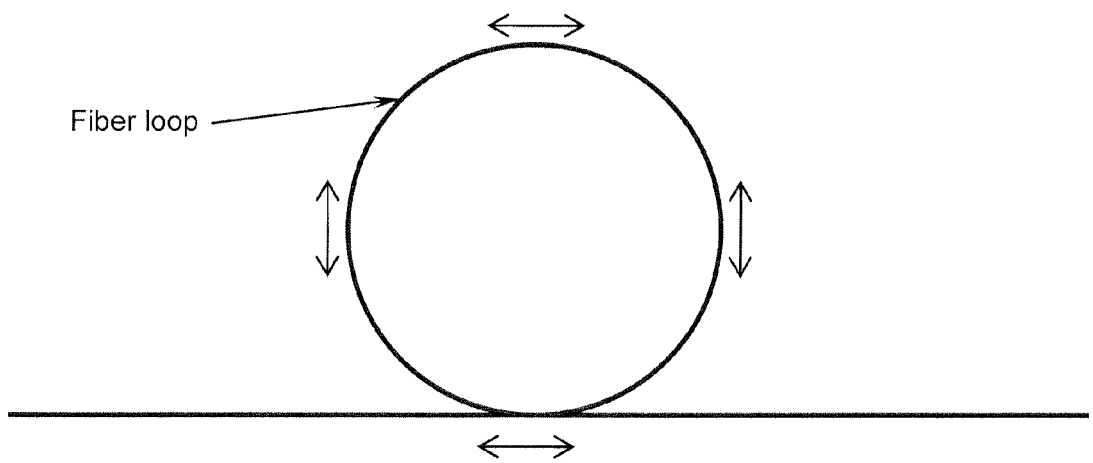
FIG. 4 shows an example fiber loop strain sensor.

A fiber rosette can also be formed from a full circular loop of fiber. FIG. 4 shows an example of a fiber loop strain sensor. While a full loop sensor is more expensive in terms of meters of fiber per length of coverage, it allows for a simplified analysis of strain. Being able to do a closed line integral:

$$\oint \vec{g}(l) \cdot d\vec{l}$$

where g is a function along the length of the fiber, and dl is the differential vector in the direction of the fiber at that point. In practice, g may be a scalar or a vector. Later, a specific case is used where g is the measured strain, and in the case of a circular fiber loop, dl is the sine and cosine of the length, leading to an expression in the form of a Fourier transform. Because closed line integrals occur so frequently in math and physics, many additional uses and applications are envisioned.

As explained above, a discrete Fourier transform of the strain or deformation around the loop may be used to separate individual strain-related parameters in a fiber loop configuration. In this case, the x and y coordinates are mapped on the surface space to the real and imaginary components of a complex number. This provides a way of handling the two dimensional vector in a compact notational form as well as takes advantage of a large body of mathematics around complex numbers. The first term of the integral is the average, total expansion of the to material in the optical loop. The next term is the gradient of this expansion field in the complex plane (x is real and y is imaginary) across the fiber loop. The third term (second harmonic term) contains information about the x and y strain levels, and when combined with the zero'th frequency term, gives the strain levels in the x and y directions. The higher order terms may also have useful physical interpretations and uses.

To help illustrate some of the terminology used in this application, consider a plate as an object to be tested. The definition of stress is force per unit area. Stress that lengthens an object is known as tension, and stress that shortens an object is known as compression. Strain is the ratio of length change to total length caused by the applied stress. FIG. 6A illustrates an object being pulled from both ends along a horizontal axis. This force lengthens the object, putting it under tension and causing positive strain. FIG. 6B illustrates an object under compression along the horizontal axis leading to negative strain.

FIGS. 7A-7C illustrate the effects of applying a uniaxial load to a test plate with an optical fiber loop bonded to the surface. FIG. 7A shows that uniaxial loading along the horizontal axis causes tension, or positive strain, on the locations of the loop whose tangents are parallel to the horizontal axis. The Poisson effect causes compression in portions in the vertical axis. This negative strain is measured in the loop at locations where the tangent is perpendicular to the horizontal axis. FIG. 7B illustrates a uniaxial load in the vertical axis. In this case, there is tension, or positive strain, at points in the loop where the tangent is parallel to the vertical axis, and compression, or negative strain occurs at points in the loop where the tangent is perpendicular to the vertical axis. FIG. 7C illustrates a uniaxial load at an arbitrary angle. Again, tension occurs along the axis of the applied load, and compression occurs perpendicular to this axis. The direction of the strain in these figures is the direction of the principle strain.

Figure 8A:
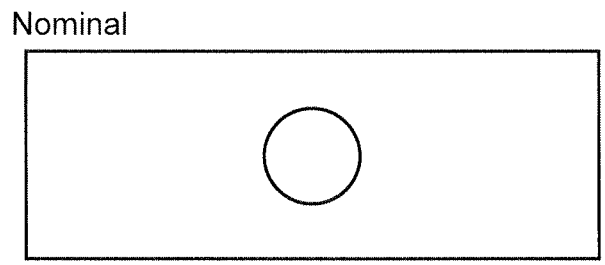
FIGS. 8A-8D illustrate effects of thermal changes applied to a test plate.
Figure 8B:
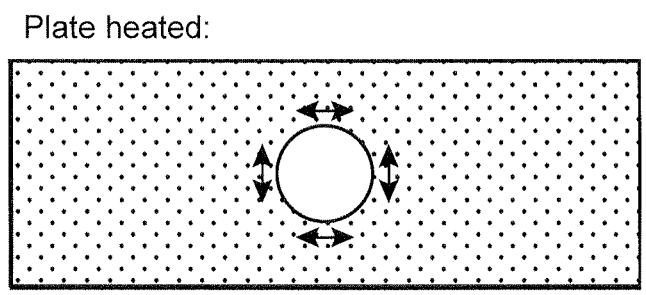
Figure 8C:
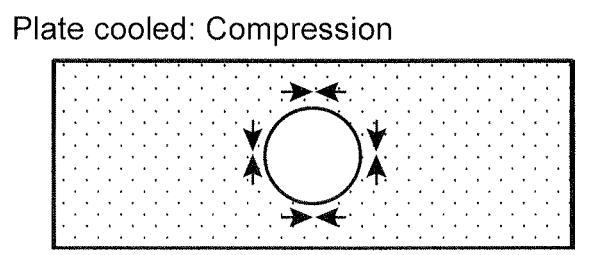
Figure 8D:
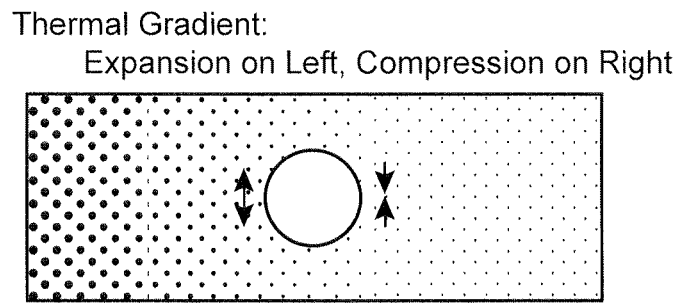

FIGS. 8A-8D illustrate the effects of thermal changes applied to a test plate. FIG. 8A shows the plate in a nominal state. FIG. 8B shows the effect of heating the plate uniformly. The plate expands according to the material's coefficient of thermal expansion. The fiber loop experiences tension all around the loop and positive strain is measured all along the fiber loop bonded to the surface. FIG. 8C illustrates the effect of cooling the plate uniformly. In this case, the plate is compressed and negative strains are measured around the entire fiber loop. FIG. 8D illustrates the strains experienced when a thermal gradient is applied to the test plate. On the left, the plate is heated and the material expands, causing tension or positive strain along the left side of the loop. On the right, the plate is cooled and the material shrinks, leading to compression or negative strain on the right side of the loop. The strain changes in a smooth, sinusoidal pattern around the loop between the points of maximum compression and tension, creating a single sinusoid with a period equal to the length of the loop's circumference.

Figure 9A:
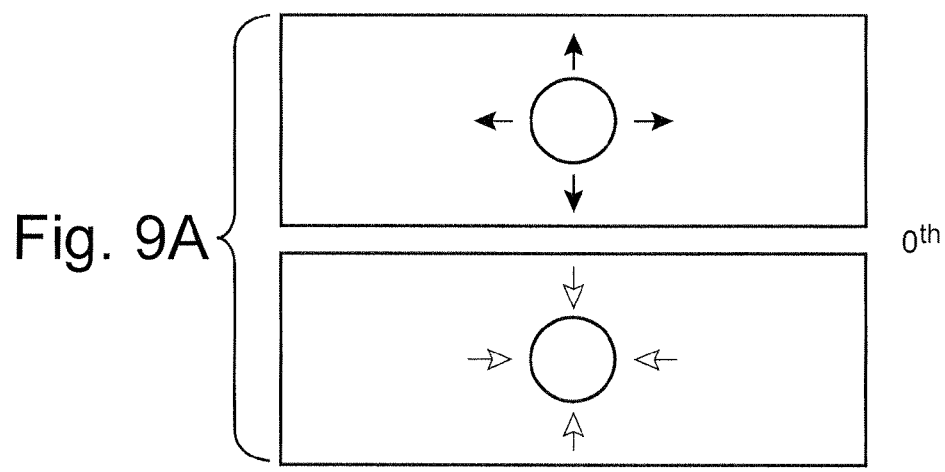
FIGS. 9A-9E illustrates various strain states on a test plate that lead to different harmonics in a strain signal measured around a fiber loop rosette.
Figure 9B:
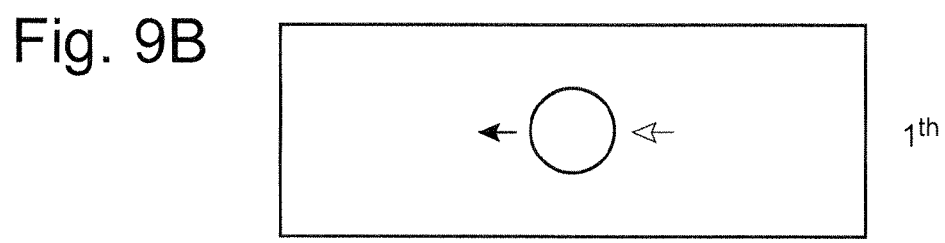
Figure 9C:
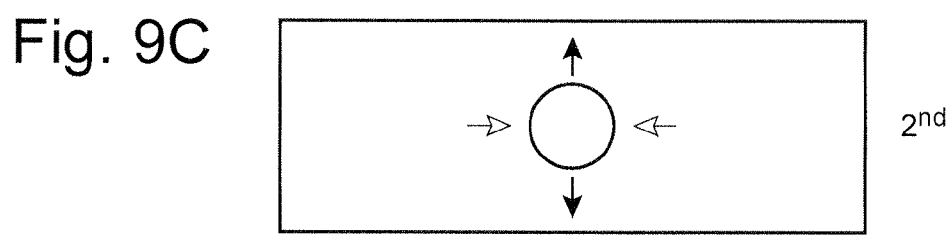
Figure 9D:
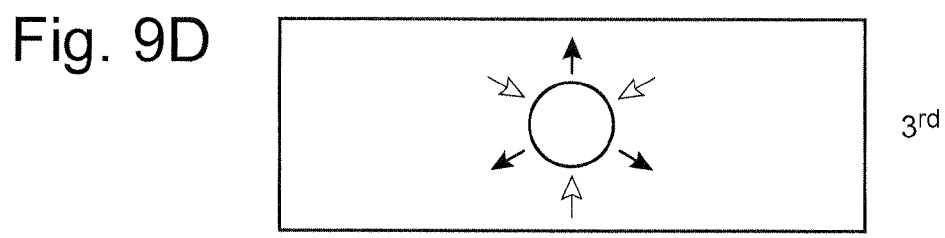
Figure 9E:
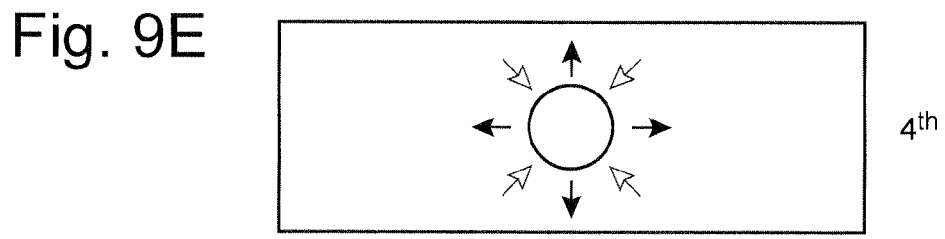

FIGS. 9A-9E illustrate various strain states on a sample plate that lead to different harmonics in the strain signal measured around a fiber loop rosette. Outward pointing arrows represent expansion, tension, or positive strain. Inward pointing arrows represent compression or negative strain. FIG. 9A shows that uniform compression or expansion of the plate can be caused by uniform cooling or heating and leads to a constant change in the strain measured around the loop when compared to the strain in a nominal state. This is a D.C. signal, or the $0^{th}$ harmonic. FIG. 9B shows a thermal gradient applied to the loop resulting in a single sinusoidal strain signal, or $1^{st}$ order harmonic, as illustrated in the FIG. 8D. The loop is under tension where the sample is heated (left side in FIG. 8D) and under compression where the sample is cooled (right side in FIG. 8D). FIG. 9C illustrates a $2^{nd}$ order harmonic strain signal. This can be caused by uniform, uniaxial loading of a test sample as illustrated in FIGS. 7A-7C. FIGS. 9D and 9E illustrate $3^{rd}$ order and $4^{th}$ order harmonics, respectively.

As described in the patents incorporated by reference above, when the optically-sensed strain data is processed in a continuous fashion, the total accumulated phase change along a length of fiber can be measured with high accuracy. The accumulated phase change as a function of distance represents the total change in the time of flight of light in the fiber or the effective change in fiber length. In this example case, the integral of the strain is measured with high accuracy. The derivative of this total change in the time of flight of light in the fiber or the effective change in fiber length is proportional to the strain or temperature change in the fiber. The relationship between the change in effective fiber length and phase change is expressed:

$$\Delta \varphi = 2\pi n \frac{2\Delta L_{eff}}{\lambda} \quad (1)$$

where $\Delta \phi$ is the change in optical phase, n is the group index of the optical fiber, $\Delta L_{eff}$ is the effective change in length, and $\lambda$ is the optical wavelength. The effective length includes effects due to changes in the index of refraction and can be expressed as follows:

$$\Delta L_{eff} = \Delta L + L\frac{\Delta n}{n} \quad (2)$$

Using an approximate group index of 1.5 and a wavelength of 1500 nm, an effective change in fiber length of 250 nm causes a π phase change. The effective change in length is related to the strain applied to the fiber by a proportionality constant related to the strain-optic coefficient k as shown in Eq. 3:

$$\frac{\Delta\varphi}{\varphi} = \frac{\Delta L_{eff}}{L} = k\varepsilon \quad (3)$$

Typical material properties for germanium doped silica yield a value of k=0.787.

As mentioned above, Fourier analysis can be used to analyze the strain data and glean information about the measured strain field. Let the total length change in the fiber loop be given by Δφ(z) where z is the distance along the fiber core (ø is chosen for the function because a change in optical phase is measured in this example). The average expansion over the fiber-encircled area on the object to be tested is then proportional to the total length change of the fiber loop attached to that object or:

$$\epsilon_0 = k[\Delta\phi(c) - \Delta\phi(0)] \quad (4)$$

Here, $\epsilon_0$ is the expansion of the material under test, k is a proportionality constant that involves the strain-optic coefficient of the fiber, C is the circumference of the loop, and Δφ(z) is the optical phase change from a zero level measurement of the object under test taken earlier.

Figure 5:
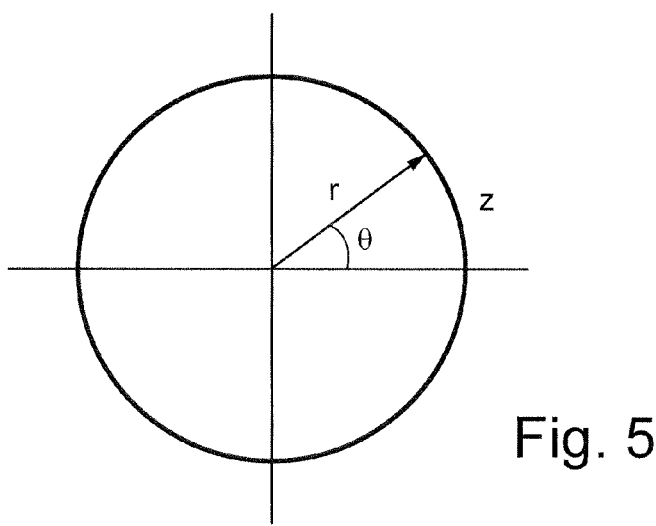
FIG. 5 shows the angle and radius of a circle loop.

If the object under test changes in such a way that the loop is stretched on one side and compressed by another, then this effect appears as a first harmonic and is illustrated in FIG. 8D. This is the case, for example, if a thermal gradient is applied to the sample, this term can be expressed as:

$$\epsilon_1(z) = \epsilon_{x,1}\cos(\theta) + i\epsilon_{y,1}\sin(\theta) \quad (5)$$

Where θ=z/r is the angle around the circle shown in FIG. 5 calculated from z, the distance along the fiber core and r, the radius of the circle as shown in FIG. 5. $\epsilon_x$ and $\epsilon_y$ is are the strains in the orthogonal directions, x and y, in the complex plane.

Figure 10:
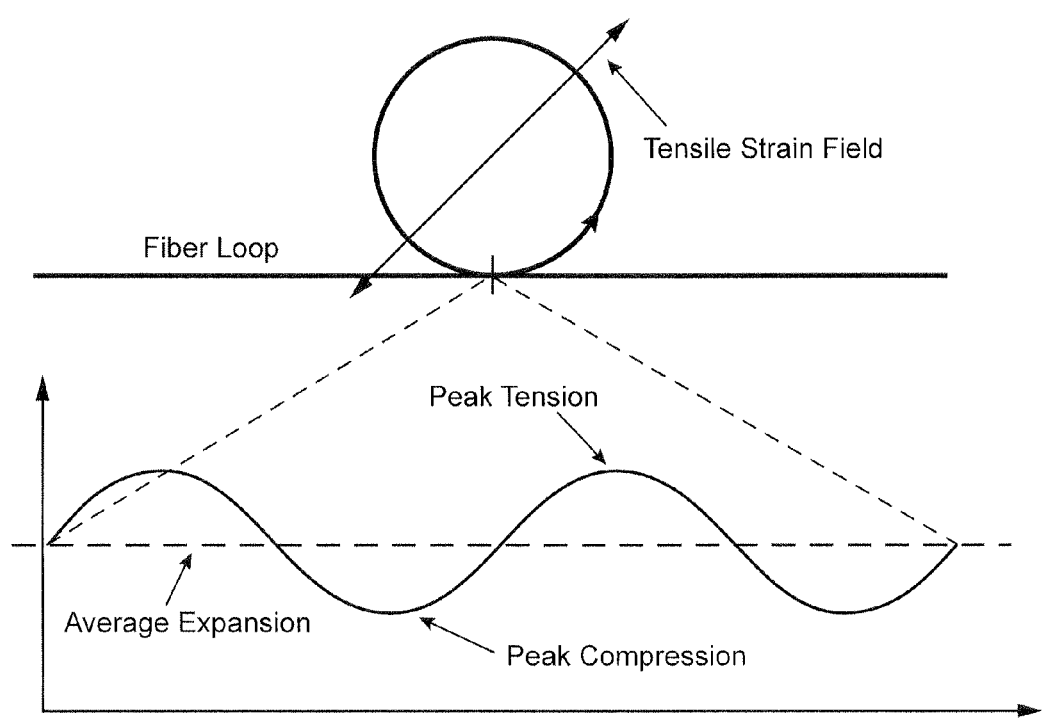
FIG. 10 illustrates periodic strain measured around the circumference of the fiber loop.

If a uniaxial strain is applied to the surface of the object to which the fiber loop is attached, then a second harmonic term is generated, i.e., two periods of a sinusoidal strain pattern around the loop. An illustration of the way in which a uniform strain field generates a second harmonic in the loop is described in conjunction with FIG. 10. FIG. 10 shows the periodic strain field that would be measured moving around the circumference of the fiber loop. This strain pattern can be expressed as:

$$\epsilon_2(z) = \epsilon_{x,2}\cos(2\theta) + i\epsilon_{y,2}\sin(2\theta) \quad (6)$$

Note that as the direction of the strain field rotates, the phase of the second harmonic term will shift. This phase shift in radians directly translates to the rotational shift in radians (with a factor of two difference).

Given the relationship between the derivative of the phase change from a reference state and the applied strain, the various Fourier elements of the strain field may be expressed by:

$$\varepsilon_m(z) = k\frac{2\pi}{C}\int_0^C [\Delta\phi(z)]' e^{i\frac{2\pi m}{C}z} dz = k\int_0^{2\pi} [\Delta\phi(\theta)]' e^{im\theta} d\theta \quad (7)$$

where k is the proportionality constant related to the strain-optic coefficient. The term $\epsilon_1$ can be interpreted as the gradient of the expansion field from a non-uniform thermal field. Because a real and imaginary part results from the calculation, the direction as well as the magnitude of the gradient can be resolved. The term $\epsilon_2$ gives the components of the uniform strain over the loop, and when combined with $\epsilon_0$, gives the total strain field.

A shape sensing fiber may be used to deduce the location and radius of such a loop as described above. A detailed description of a shape sensing fiber is described in "Optical Position and/or Shape Sensing," U.S. application Ser. No. 12/874,901, incorporated herein by reference. Even an 80 micron diameter fiber can support 4 cores by spacing the off-center cores 40 microns from the center. Such a multi-core fiber is not expensive, and can be used to map out the geometric layout of the curved fiber in both loop-curve and arc-curve configurations.

As shape systems improve, a 125 micron shape sensing fiber bonded to complex structures may be used to map out the shape of the attached fiber. If a numerical model of the mechanical part under test is determined, then the set of locations along the fiber may be matched up to the mechanical model, and the individual points of the fiber strain measurement (along with the axis over which the strain is measured) may be mapped directly to the mechanical structure's surface.

Figure 11A:
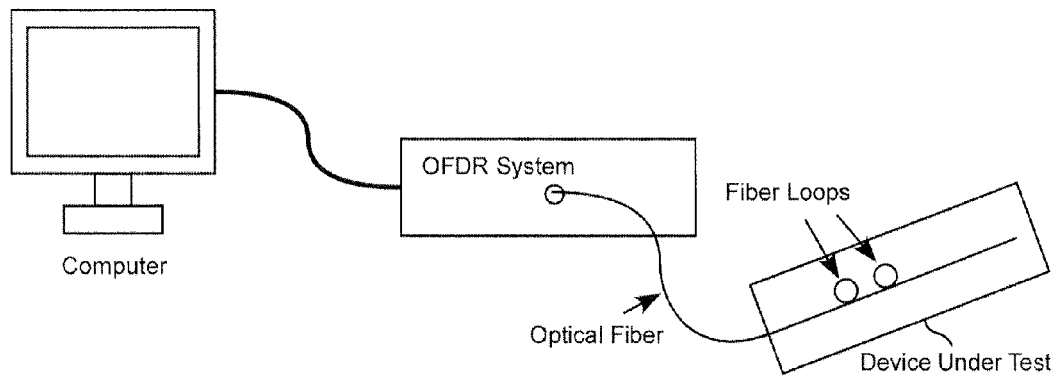
FIG. 11A is a function block diagram of an OFDR system for measuring strain of a test plate using multiple fiber loops bonded to the test plate.

FIG. 11A is a non-limiting example block diagram of an optical frequency domain reflectometry (OFDR) measurement system for measuring strain in fiber loop rosettes on a test sample. OFDR enables measurements of the amplitude and phase of the light backscattered along a fiber with high sensitivity and high spatial resolution. This measurement, in turn, makes it possible to detect the shift in the reflected spectrum of the scattered light as a function of distance down the fiber due to applied strain or temperature changes. The OFDR measurement system is connected to a computer or controller for system control and data processing. The OFDR measurement system is optically connected to a device or object under test via an optical fiber that includes two fiber loops (in this example) attached to the object. It should be appreciated that the technology may be used with a fiber having just one or multiple curved portions (arcs) being attached to the object. The OFDR system measures the light reflected from the attached fiber and the computer system determines multiple strain related parameters based on the mathematics described above. The technology in this application, though well-suited for OFDR-based measurement, may be used with other fiber-optic-based measurement techniques such as but not limited to path matching white light interferometer, ultra-fast laser pulse interferometry, high resolution Brillion scatter sensing, and wave division multiplexing of Bragg gratings.

Ultimately, the computer generates an output associated with or corresponding to one of more of multiple strain-related parameters including but not to limited to an expansion of the object, a thermal gradient associated with the object, and/or a stress-induced strain at multiple locations on the object corresponding to ones of the multiple points along the curved portion of the fiber. The output could be any useful information useable by a human or a machine including a display, an alarm, a file, or a stream of strain and/or temperature data coming over a communication link.

Figure 11B:
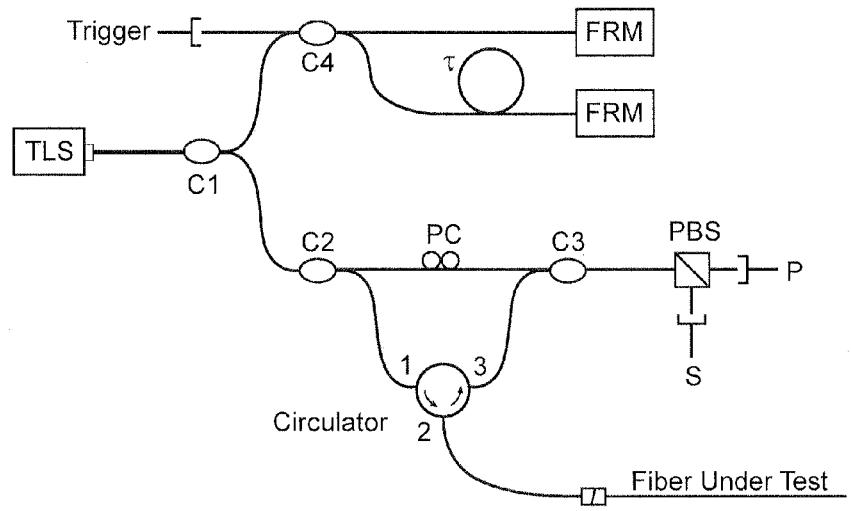
FIG. 11B is a diagram of an example, non-limiting OFDR system.

FIG. 11B shows schematically a non-limiting example of an optical network that can be used for OFDR measurements in FIG. 11A. Other OFDR-based networks could be used. Light from a tunable laser (TLS) is split at coupler C1 between two interferometers. Light going to the upper interferometer is split at coupler C4 between two fibers with a delay difference, τ, connected to Faraday rotator mirrors (FRMS) to ensure polarization variations do not disturb the interference signal. The interference fringes caused by recombining the light from these two paths at coupler C4 are detected and used to trigger data acquisition so that data is taken in equal increments of optical frequency as the laser tunes. The lower interferometer splits the incoming laser light between a reference path and a measurement path at coupler C2. The light in the measurement path travels to the fiber which is attached to the object under test and reflected light returns through an optical circulator. The reference and measurement light are recombined at coupler C3. The polarization controller (PC) in the reference path is used to ensure that light in this path is aligned with the axis of the polarization beam splitter such that it is split evenly between the two optical detectors labeled S and P. This polarization diverse detection scheme enables a consistent measure of the reflected light regardless of its polarization state. The data acquired at the optical detectors S and P as the laser tunes through a given wavelength range is then Fourier-transformed. The Fourier-transformed S and P data are combined to yield the amplitude and phase of the reflected light as a function of distance.

Figure 12:
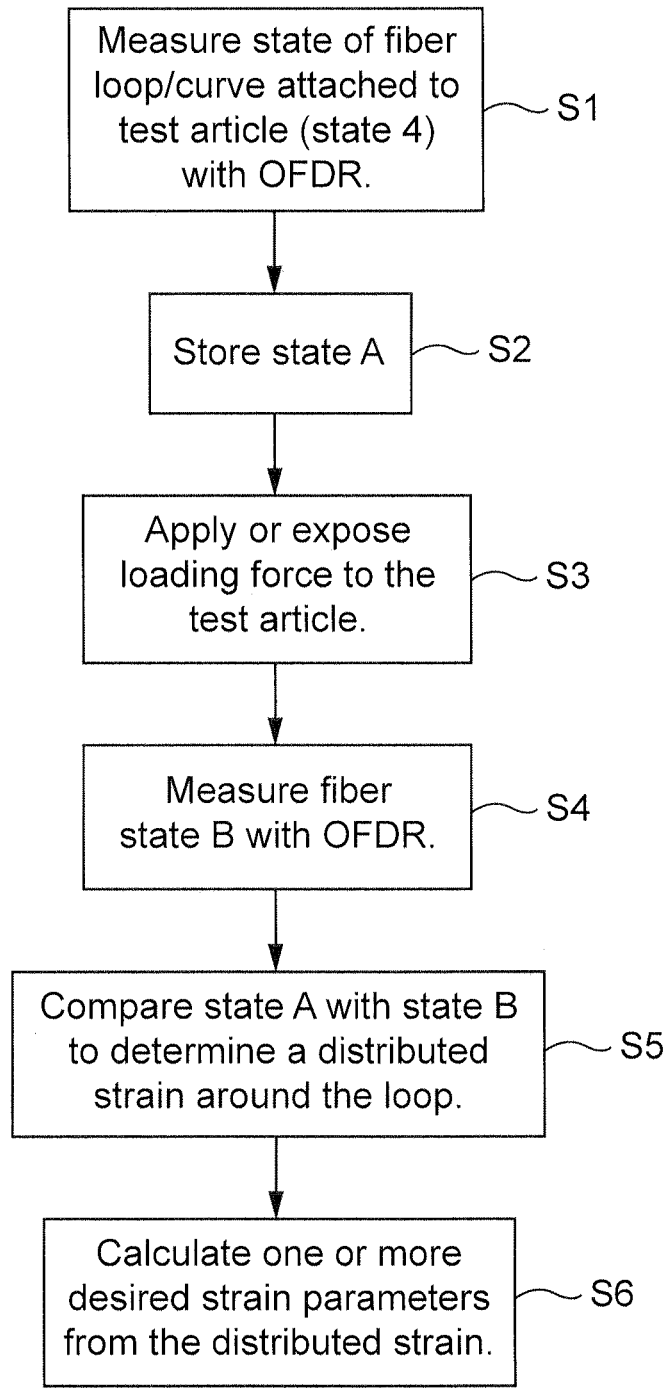
FIG. 12 is a flowchart diagram illustrating example, non-limiting procedures for calculating one or more strain related parameters using the example system shown in FIGS. 11A and 11B.

FIG. 12 is a flowchart diagram of non-limiting example procedures that may be performed using the OFDR measurement system of FIGS. 11A and 11B. After one or more optical fiber arc or loop curves is attached to the object, the OFDR measurement system measures a state A of the fiber curve(s) attached (step S1), where this measurement of state A contains the phase relationships and amplitudes of each of the scatter points in the optical fiber at the particular time of the measurement using a distributed, optically-based, strain sensing technique in at least the curved portion of the fiber and stores state A (step S2). The distributed, optically-based, strain sensing technique may be based for example on Rayleigh scatter and/or using multiple Bragg gratings in at least the curved portion(s) of the fiber. The object is exposed to some force or condition, e.g., a load, temperature, etc., (step S3), and the OFDR measurement system measures a state B of the fiber curve(s) attached (step S4). The computer compares (e.g., differentiates or correlates) state A to state B and determines a distributed strain around the curve (step S5). One or more desired strain parameters are calculated from that distributed strain including but not limited to an expansion of the object, a thermal gradient associated with the object, a stress-induced strain a multiple locations/points on the object, or higher order strain terms such as those illustrated in FIGS. 9D and 9E (step S5). The calculations include taking a frequency transform of the distributed strain information.

In one example operation, the OFDR system sweeps a tunable laser over a wavelength range, and recording the interference effects on the three detectors shown in FIG. 11B. The signal on the trigger detector is used as an accurate measure of the laser tuning, and this measurement is used to convert the data acquired on the S and P detectors into a signal that is precisely linear in laser frequency (this is described in detail in U.S. Pat. Nos. 5,798,521 and 6,566,648 incorporated herein by reference). A Fourier transform is then taken of the each of these S and P signals, and the result of this transform then represents the complex (phase and amplitude) scatter at each point along the fiber. Initially, a measurement is performed on the fiber in a "zero" or reference state, and this data is stored. Later, another measurement is made in an unknown state, and the phase change along the length of the fiber is measured to produce a measurement of the total fiber length change at each point along the fiber. A detailed description of this process is in "Optical Position and/or Shape Sensing," U.S. application Ser. No. 12/874,901, incorporated herein by reference. From this measurement of the total length change in the fiber, a strain can be calculated simply by calculating the rate of change of the length as a function of the overall length.

Figure 13:
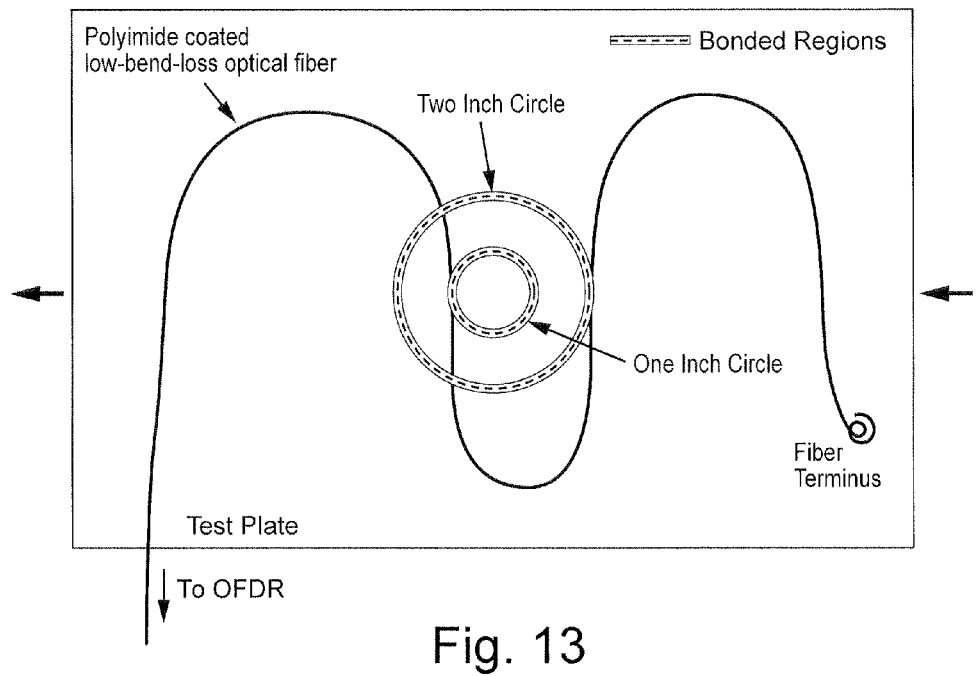
FIG. 13 is a diagram of two concentric fiber loops bonded onto a test sample.

A non-limiting, example test from single core fiber with multiple loops is now described. As a test example, a 125 micron glass diameter polyimide coated high numerical aperture single mode optical fiber was bonded in two concentric circles on a 10×6 inch aluminum plate 0.25 inches thick. The interior circle was one inch in diameter, and the exterior circle was two inches in diameter. Two smaller loops were bonded only at the base to serve as unconstrained temperature sensors. Various loads were applied to the sample using a load frame. An extensometer with a one inch gage length was attached to the sample to provide a reference measurement. FIG. 13 illustrates the two loop fiber path on the test plate. The smaller one inch loop was included within the larger two inch loop. The bolded arrows indicate the direction of the loading for when the plate was held straight.

The plate was subjected to increasing load levels, and the Rayleigh scatter signature was used to measure the phase change along the core of the optical fiber as described in U.S. application Ser. No. 12/874,901, entitled Optical Position and/or Shape Sensing, which is incorporated herein by reference.

Figure 14:
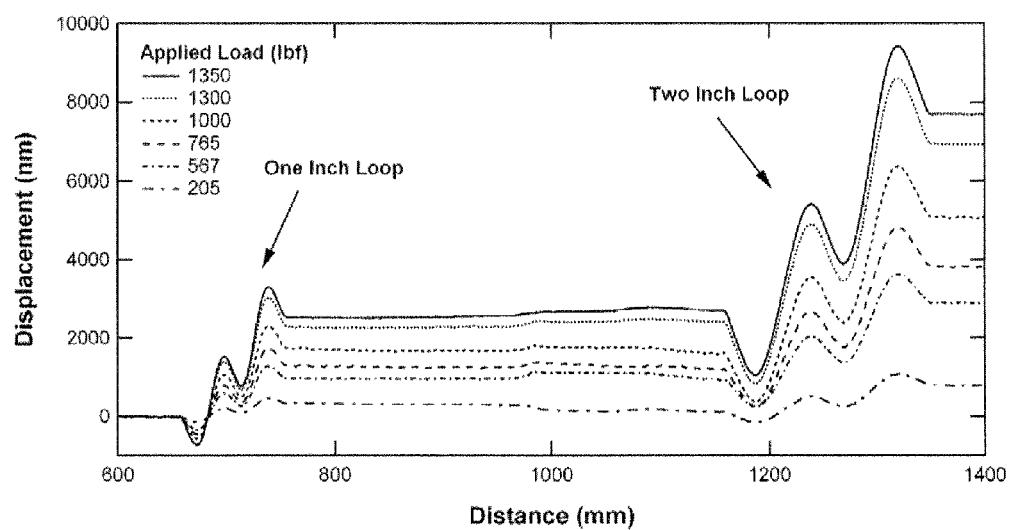
FIG. 14 is a graph illustrating optical displacement as a function of distance along the sensing fiber for the test sample in FIG. 13.
Figure 15:
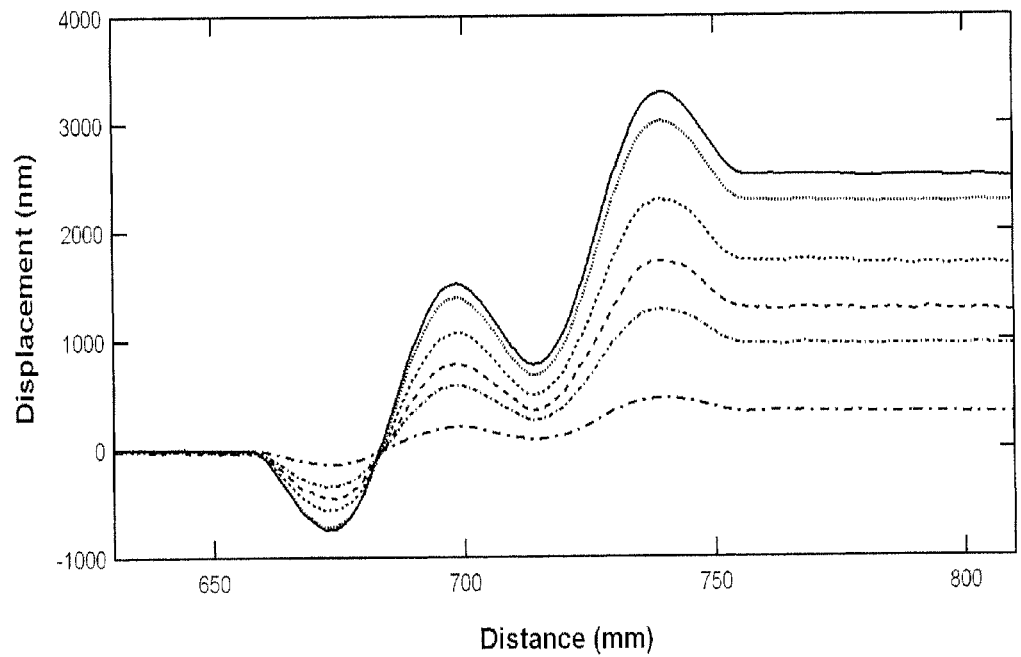
FIG. 15 is a closer view from FIG. 14 of the optical distance change along the length of fiber in the one inch diameter loop.

In order to accurately track the accumulated phase change along the length of the fiber, the phase is preferably measured with a spatial resolution high enough such that the phase does not change by more than ±π within the spatial resolution. Otherwise, a phase change of $\pi+\delta$ is indistinguishable from a change of $\delta$, and errors are introduced in the phase measurements. For the measurements taken in the test, the scan range was 5 nm yielding a spatial resolution of 160 μm. Using the value for k mentioned above, a π phase change in a 160 μm step represents an applied strain of about ±2,000με. In order to measure strains larger than this, a longer scan range can be used to achieve a higher spatial resolution. The phase change along the fiber, converted to displacement in nanometers, is shown in FIG. 14. FIG. 14 graphs optical displacement as a function of distance along the sensing fiber. Displacements for various loads 205, 567, 765, 100, 1300, and 1350 lbf are shown. Four measurements were taken at the load of 1350 lbf. FIG. 15 shows a closer view of the optical distance change along the length of fiber in the one inch diameter loop. The displacements for the loads 205, 567, 765, 100, 1300, and 1350 lbf are shown. Four measurements were taken at the load 1350 lbf.

Figure 16:
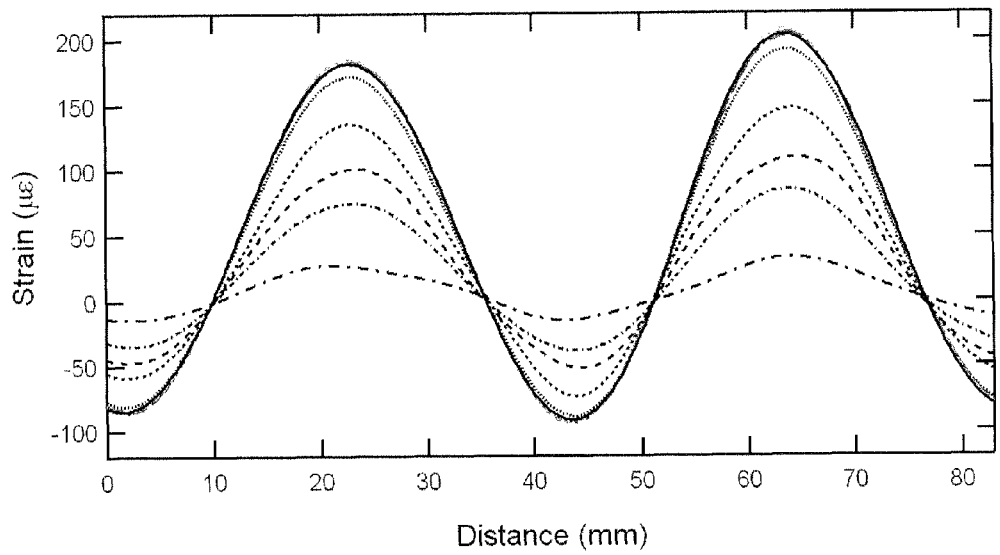
FIG. 16 is a graph illustrating strain along the fiber on the inner concentric fiber loop for the test sample in FIG. 13.

If a length of fiber is selected to wrap around the circumference of the one inch diameter circle and the strain around it is calculated, the periodic strain fields shown below in FIG. 16 are produced. The strains for loads 205, 567, 765, 100, 1300, and 1350 lbf are shown. For the four measurements at the load 1350 lbf, the maximum variation across the four measurements at any given location is 6με. The average standard deviation over all locations at this load level is 1.26με.

Table 1 shows a comparison of the strain data as measured with the extensometer with the maximum strain measured in the fiber loop. A point 64 mm into the loop at the maximum strain location as shown in FIG. 16 was used for the fiber data.

This comparison shows that the fiber measurements varied from the extensometer results only by a maximum of 7µε and an average of 3µε.

TABLE 1

| Load (lbf) | Fiber (µε) | Extensometer (µε) |
|---|---|---|
| 205 | 33 | 26 |
| 567 | 85 | 81 |
| 765 | 109 | 109 |
| 1000 | 147 | 145 |
| 1300 | 192 | 189 |
| 1350 | 203 | 200 |

Figure 17:
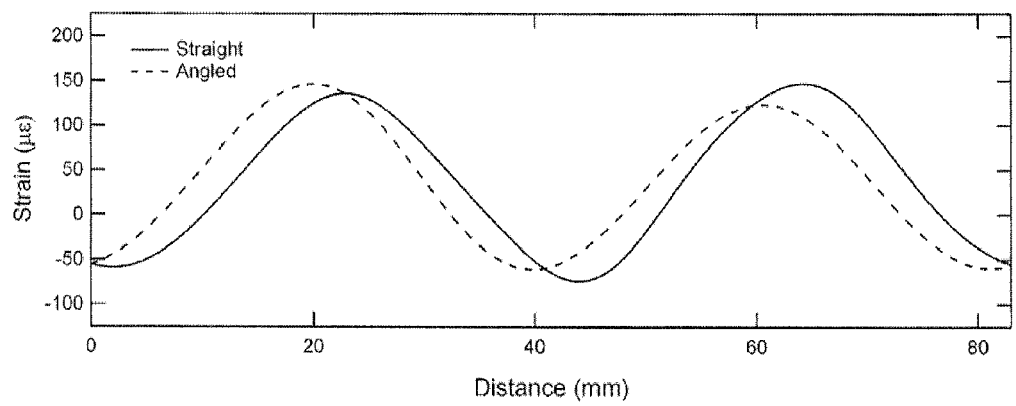
FIG. 17 is a graph illustrating strain along the fiber on the inner concentric fiber loop with the sample straight in a load frame (solid) and angled 12 degrees in the load frame (dashed)
Figures 18A, 18B:
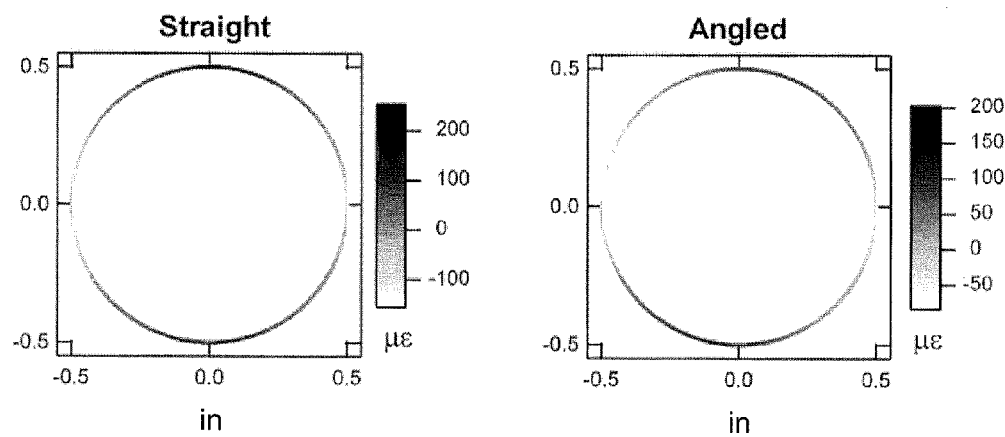
FIGS. 18A and 18B shows gray scale-coded strain plotted around loop for the sample held a) vertically in the load frame and b) tilted 12 degrees in the load frame.

FIG. 17 shows the strain along the fiber on the one inch loop with the sample straight in the load frame (solid) and angled 12 degrees in the load frame (dashed). In this data, the strain data from in the angled state is shifted in phase with respect to the straight data. The direction of the applied load can be determined from the phase shift in the data. Here it is useful to show the circle with the strain levels shown on a gray scale. FIGS. 18A and 18B show two such plots: FIG. 18A with the plate held straight, and FIG. 18B with the plate is tilted by twelve degrees to illustrate the ability of the loop to discriminate the direction of the applied uniaxial strain.

Figure 19:
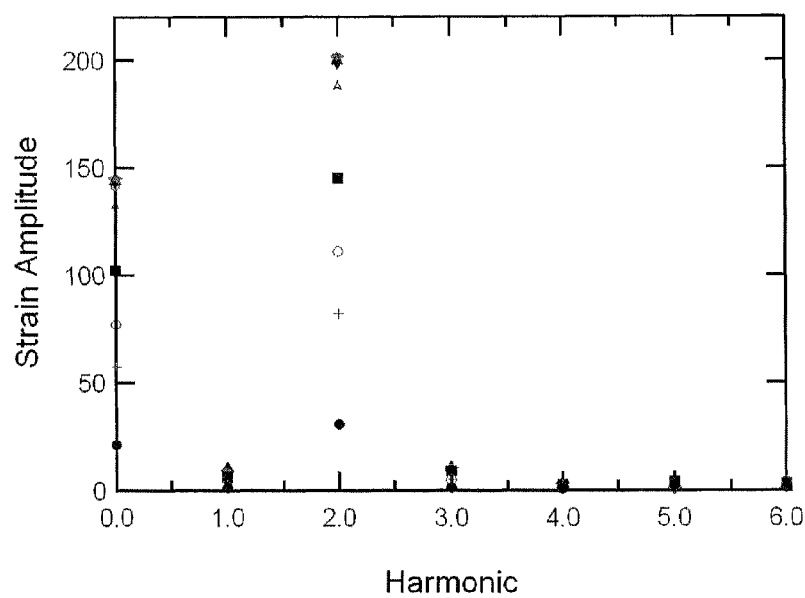
FIG. 19 is a plot of the Fourier transform of the strain around a single one inch fiber loop for different loads.

A Fourier transform of the distributed strain data reveals that only the fundamental $0^{th}$ (average value) term and $2^{nd}$ harmonic have substantial signal levels present. The amplitude of the $2^{nd}$ harmonic is a measure of the uniaxial stress present. The phase of the $2^{nd}$ harmonic term is an indication of the direction of the applied stress. FIG. 19 graphs the Fourier transform of the strain around a single one inch fiber loop for 205, 567, 765, 100, 1300, and 1350 lbf loads are shown. Four measurements were taken at 1350 lbf. In the case of the straight pull data, where the applied force was in the direction of the long length edge of the sample, the phase was 165.5 degrees. The angled data, where the sample was pulled in a direction different from the long length edge of the sample, had a phase of 193.8 degrees. The difference in the pull direction was (193.8−165.5)/2=14 degrees, which is reasonably close to the actual tilt of the plate, as measured with a protractor, i.e., 12 degrees.

Figure 20:
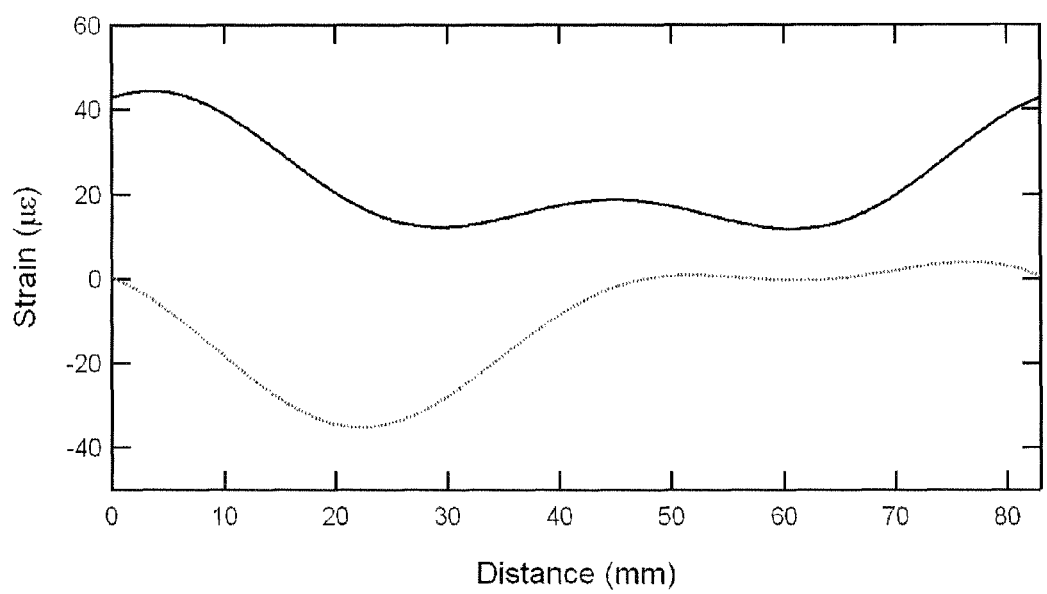
FIG. 20 is a graph of strain as a function of distance along the circumference of the one inch diameter loop for two temperature gradient configurations.
Figure 21:
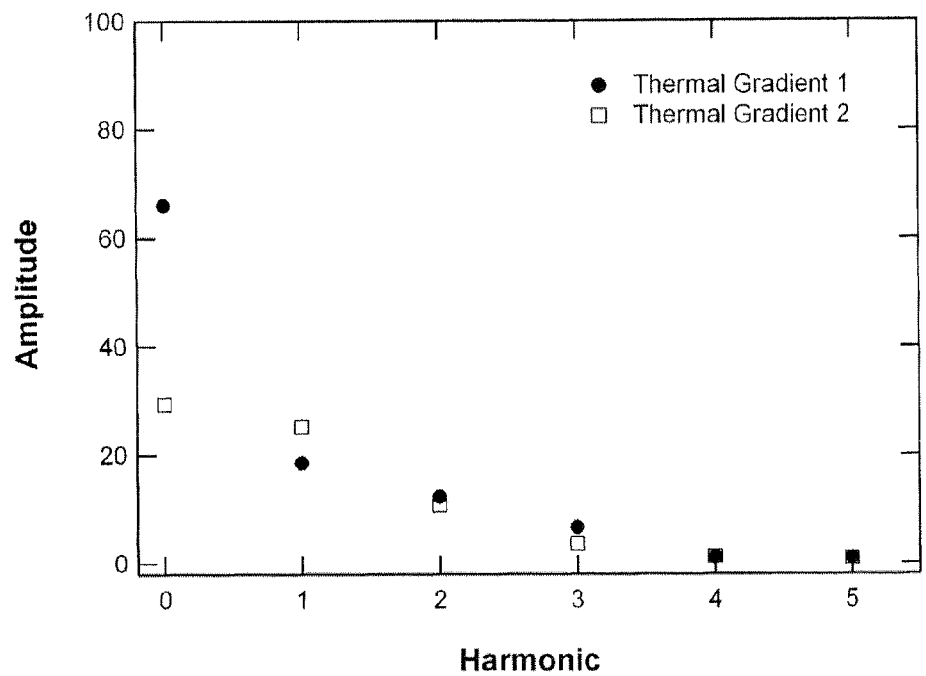
FIG. 21 is a graph of a Fourier analysis of two thermal gradients, with one induced horizontally and the other induced vertically.

A homogeneous rise in the temperature causes a uniform expansion of the fiber loop and only creates a Fourier component at the $0^{th}$ harmonic. A temperature gradient, however, produces a signal at the first harmonic. Although obtaining a uniform thermal gradient may be difficult in some circumstances, relatively non-uniform gradients can usually be used with success. The strain fields around the loop for a vertical and horizontally induced strain field is shown in FIG. 20 (strain as a function of distance along the circumference of the one inch diameter loop for two temperature gradient configurations), and a Fourier analysis is shown in FIG. 21 (Fourier analysis of two thermal gradients with one induced horizontally and the other induced vertically).

Figures 22A, 22B:
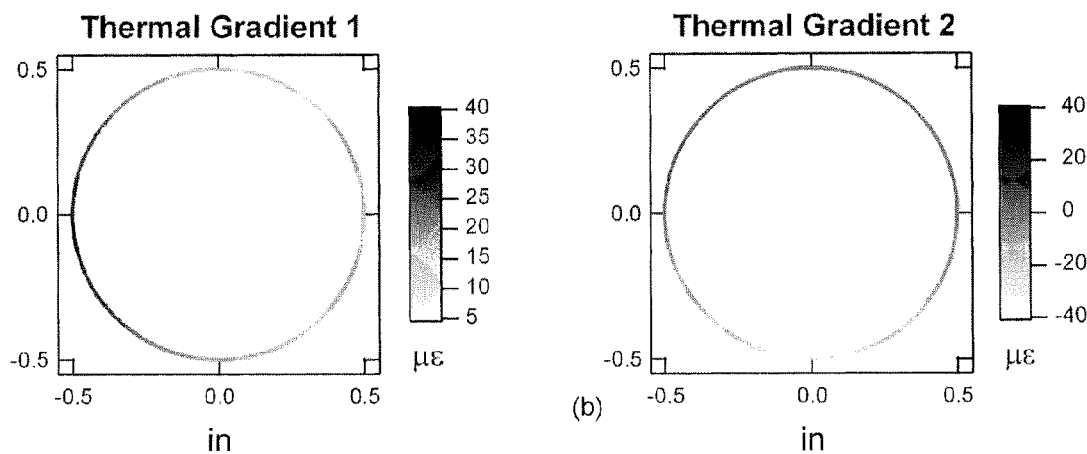
FIGS. 22A and 22B are gray scale-coded strain plotted around the loop for two induced temperature gradients.

Again, the phase of the first harmonic is used to indicate the direction of thermal gradient. The phase of the vertical thermal gradient is −15 degrees, and the phase of the horizontal thermal gradient is 80 degrees, which puts the angular difference between the two at 95 degrees, which is about as close as could be expected with the crude apparatus used to induce the gradient. FIGS. 22A and 22B show the thermally induced strain fields around the loop showing the directional nature of the measurement.

One can take similar data as shown above with closely-spaced fiber Bragg gratings (FBGs) using a wave division multiplex (WDM) distributed sensing technique. But there may be some limit in this case on the size of the fiber loop. In the case of the one inch loop used above, one example might use eight FBGs spaced at 1 cm intervals to attain a desired resolution. Even smaller fiber loops, e.g., one cm diameter, may be used to produce similar results. The loop size is mainly limited by the material properties of the fiber. For example, an 80 µm outer diameter fiber could be used to form smaller loops. For small loop sizes, placing enough FBGs in the fiber loop is less feasible, and a high-resolution continuous sensing technique is likely preferable.

Fiber optic sensors are advantageous because they are light, immune to electromagnetic interference, and relatively easily multiplexed. The highly distributed nature of OFDR sensing technique described above can replace traditional electrical strain gages, including rosette strain gages, in applications where large numbers of strain measurements are required. By placing an optical fiber in a loop, strain is projected along the fiber at a continuum of angles traversing the loop. Distributed OFDR techniques can measure the strain with high resolution (currently better than every millimeter), and thus provide numerous independent strain measurements around the loop. For example, a 1 cm diameter loop may include about 30 one millimeter strain sensing sections. These measurements around the loop can be used to calculate several parameters with good accuracy including resolving the strain into uniform expansion (such as a rise in overall temperature would cause), strain in the horizontal direction (0 degrees), and strain in the vertical direction (90 degrees). In addition, vertical and horizontal gradients can also be acquired, as well as higher order terms. distributed nature of OFDR sensing technique described above may be used for example in the testing of structures designed to carry heavy loads such as submarines or ships as well as structures designed to carry heavy loads and to simultaneously be light weight, such as aircraft or automobiles. Finally, the highly distributed nature of the measurement and the ability to make multiple small loops that do not interference with the structure (only a single fiber lead) means that the technique can be used in biomechanics and other mechanical structures that are small and complex.

The technology uses a curved fiber attached to an object to measure strain components in more than one direction. Other strain measurement techniques, including traditional electrical strain gages and other fiber optic methods, require straight sensing areas over which the strain is uniform. Eliminating this straight section requirement, the disclosed technology simplifies the application and installation of the sensor and makes the sensor more compatible with higher degrees of multiplexing since loops or curves are easily cascaded. The technique described allows the use of unaltered, off-the-shelf fiber and provides an inexpensive, single connection strain rosette. Multiple rosettes may be formed in a single fiber placed as desired on a structure to provide a more detailed picture of the stresses.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for measuring one or more mechanical parameters of an object subjected to a force or condition, where at least a curved portion of a single core optical fiber is attached to the object, the method comprising:
   using a distributed, optically-based, strain sensing technique to determine strain information at each of multiple points along the curved portion of the single core optical fiber;
   processing the determined strain information to generate one or more representations of one or more of the following:
      an expansion of the object,
      a thermal gradient associated with the object, or
      a stress-induced strain and a direction of that strain in a two-dimensional plane at multiple locations on the object corresponding to multiple points along the curved portion of the single core optical fiber; and
   generating an output corresponding to the representation.

2. The method in claim 1, wherein the curved portion of the single core optical fiber forms an arc that covers at least 90 degrees.

3. The method in claim 1, wherein the single core optical fiber includes one or more fiber loops.

4. The method in claim 1, wherein the force or condition includes one or more of stress, load, temperature, temperature gradient, or higher order strain terms.

5. The method in claim 1, wherein the object is subjected to a stress and to a temperature gradient and the processing distinguishes between temperature-induced strain and stress-induced strain.

6. The method in claim 1, wherein the distributed, optically-based, strain sensing technique is based on Rayleigh scatter in at least the curved portion of the single core optical fiber.

7. The method in claim 1, wherein the distributed, optically-based, strain sensing technique is based on Bragg gratings positioned along at least the curved portion of the single core optical fiber.

8. The method in claim 1, wherein the processing is based on a relationship between a change in phase in transmitted and reflected light through the curved portion of the single core optical fiber and a change in length in the curved portion of the single core optical fiber, and wherein the processing includes taking a Fourier transform of the determined strain information to generate the one or more representations.

9. The method in claim 8, wherein the Fourier transform produces a first order term corresponding to a derivative of the change in phase that is associated with the expansion of the object.

10. The method in claim 9, wherein the Fourier transform produces a first harmonic term that is a geometric function of an angle of the curved fiber portion that is associated with the thermal gradient associated with the object.

11. The method in claim 10, wherein the Fourier transform produces a second harmonic term that is a geometric function of twice an angle of the curved fiber portion that is associated with the stress-induced strain at multiple locations on the object corresponding to ones of the multiple points along the curved portion of the single core optical fiber.

12. The method in claim 11, wherein the Fourier transform produces higher order terms higher than the second harmonic term.

13. The method in claim 1, wherein the multiple points along the curved portion of the single core optical fiber include at least three points spaced along the curved portion such that a first one of the points is oriented at zero degrees, a second one of the points is oriented 90 degrees from the first point, and a third one of the points is oriented between the first and second points.

14. Apparatus for measuring one or more mechanical parameters of an object subjected to a force or condition, where at least a curved portion of a single core optical fiber is attached to the object, the apparatus comprising electronic circuitry configured to:
   use a distributed, optically-based, strain sensing technique to determine strain information at each of multiple points along the curved portion of the single core optical fiber;
   process the determined strain information to generate one or more representations of one or more of the following:
      an expansion of the object,
      a thermal gradient associated with the object, or
      a stress-induced strain and a direction of that strain in a two-dimensional plane at multiple locations on the object corresponding to multiple points along the curved portion of the single core optical fiber; and
   generate an output corresponding to the one or more representations.

15. The apparatus in claim 14, wherein the single core optical fiber includes multiple alternating arcs.

16. The apparatus in claim 14, wherein the single core optical fiber includes one or more fiber loops.

17. The apparatus in claim 14, wherein the object is subjected to a stress and to a temperature gradient and the processing distinguishes between temperature-induced strain and stress-induced strain.

18. The apparatus in claim 14, wherein the distributed, optically-based, strain sensing technique is based on Rayleigh scatter in at least the curved portion of the fiber.

19. The apparatus in claim 14, wherein the processing is based on a relationship between a change in phase in transmitted and reflected light through the curved portion of the fiber and a change in length in the curved portion of the single core optical fiber, and wherein the processing includes taking a Fourier transform of the determined strain information to generate the one or more representations.

20. The apparatus in claim 19, wherein the Fourier transform produces a zeroth order term corresponding to a derivative of the change in phase that is associated with the expansion of the object, a first harmonic that is a geometric function of an angle of the curved fiber portion that is associated with the thermal gradient associated with the object, and a second harmonic that is a geometric function of twice an angle of the curved fiber portion that is associated with the stress-induced strain at multiple locations on the object corresponding to ones of the multiple points along the curved portion of the single core optical fiber.

21. The apparatus in claim 14, wherein the multiple points along the curved portion of the fiber include at least three points spaced along the curved portion such that a first one of the points is oriented at zero degrees, a second one of the points is oriented 90 degrees from the first point, and a third one of the points is oriented between the first and second points.

22. The apparatus in claim 14, wherein the electronic circuitry includes an optical frequency domain reflectometer.

23. Apparatus for measuring one or more mechanical parameters of an object subjected to a force or condition, where at least a curved portion of an optical fiber is attached to the object, the apparatus comprising electronic circuitry configured to:
  use a distributed, optically-based, strain sensing technique to determine strain information associated with multiple points along the curved portion of the fiber;
  process the determined strain information, including taking a Fourier transform of the determined strain information, to generate one or more representations of one or more of the following:
  an expansion of the object,
  a thermal gradient associated with the object, or
  a stress-induced strain at multiple locations on the object corresponding to ones of the multiple points along the curved portion of the fiber; and
  generate an output corresponding to the one or more representations.

* * * * *